W. S. HADAWAY, Jr.
METHOD OF PRODUCING ELECTRIC HEATERS.
APPLICATION FILED MAY 14, 1914.

1,163,659. Patented Dec. 14, 1915.

WITNESSES
J. A. Young
F. Graves

INVENTOR
William S. Hadaway Jr.
BY R. J. Dearborn
ATTORNEY

UNITED STATES PATENT OFFICE.

WILLIAM S. HADAWAY, JR., OF NEW ROCHELLE, NEW YORK.

METHOD OF PRODUCING ELECTRIC HEATERS.

1,163,659.

Specification of Letters Patent.   Patented Dec. 14, 1915.

Application filed May 14, 1914.   Serial No. 838,442.

*To all whom it may concern:*

Be it known that I, WILLIAM S. HADAWAY, Jr., a citizen of the United States of America, and a resident of New Rochelle, Westchester county, and State of New York, have invented certain new and useful Improvements in Methods of Producing Electric Heaters, of which the following is a specification, reference being had to the accompanying drawings, forming a part thereof.

My invention relates to electric heaters and particularly to soldering irons and like appliances having a cylindrical or prismatic form.

One object of my invention is to provide a simple method for advantageously producing a rugged and compact heater of the character above indicated that shall effectively transfer the generated heat to the working surface.

Other objects and advantages of my invention will be set forth hereinafter, and in order that my invention may be thoroughly understood, I will now proceed to describe the same in the following specification, and then point out the novel features thereof in appended claims.

Figure 1:
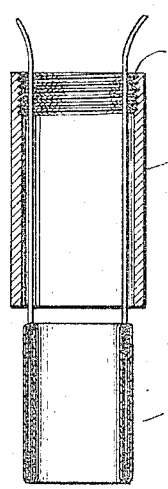
Figure 4:
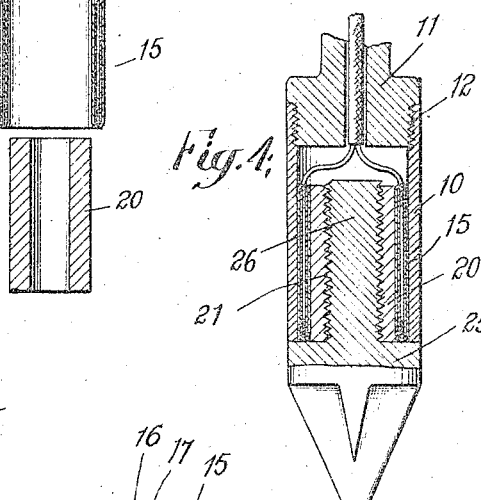
Figure 5:
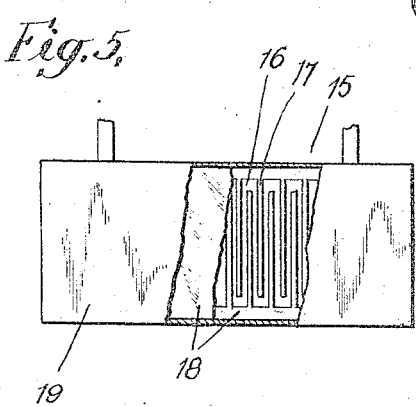
Figure 6:
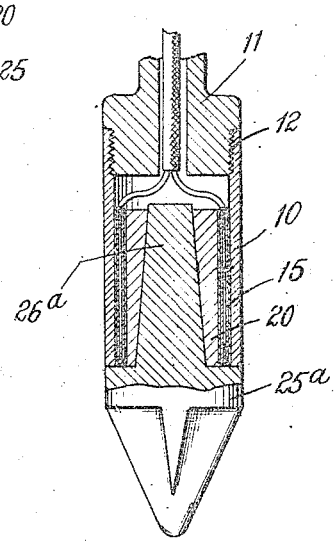

Referring to the drawings: Figure 1 is a sectional view illustrating the principal parts, before they are assembled, of a heater embodying my invention. The same parts assembled in loose contact are similarly shown in Fig. 2. The next step in carrying out the method of my invention is illustrated in Fig. 3 which also shows the parts in section. The completed body of a soldering iron or like implement is shown in section in Fig. 4. Fig. 5 is a detail view of a heating element which is suitable for use in the device shown in the other figures, the casing or armor being broken away to disclose the resistance member and its insulation. Fig. 6 corresponds to Fig. 4 and shows a modified structure which also embodies my invention.

The structure of Figs. 1 to 5 inclusive comprises an outer shell 10, an armored heater 15, an expander 20, and a working element or body 25.

The outer shell may be cylindrical in form and constructed of steel or other material having mechanical strength and rigidity. Its form and composition are however determined to a certain extent by the service to which it is applied. As a convenient means for affixing a supporting member or handle 11, it is internally threaded at one end as shown at 12.

While the heater may have any suitable form and be constructed in any well known manner, it may advantageously comprise a resistance ribbon 16 having lateral slots 17 cut alternately from opposite edges to form a tortuous path for the electric current, thin insulating strips 18 and a sheet metal armor 19. Mica may suitably be used for the insulation and copper for the armor.

Figure 2:
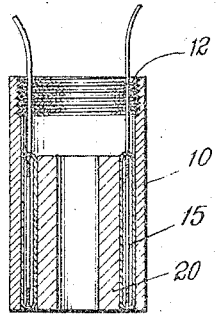
Figure 3:
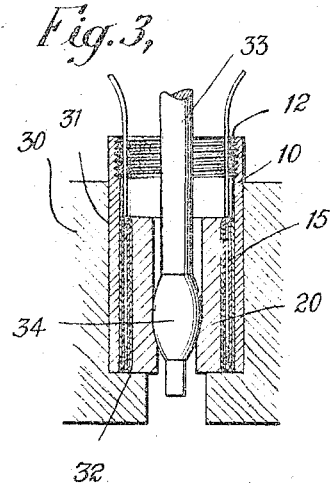

The expander 20 is made of relatively soft and highly conductive metal such as copper and is first formed into a hollow cylinder having relatively thick walls and a smooth cylindrical bore as shown in Figs. 1, 2 and 3.

The device is assembled and completed as follows: The parts are so constructed that they may be readily assembled in a preliminary way by merely forcing them one within the other into the relation shown in Fig. 2. They are then placed in a recess 31 of a die 30 which has a shoulder 32 on which the outer ends of the parts 10, 15, 20 rest. A mandrel 33 is next forced through the expansion member 20 under very high pressure. The mandrel has an enlargement 34 which is larger in diameter than the bore of the member 20, and consequently, as it is forced through it, the relatively soft metal of which the member 20 is composed is swaged, forced outwardly or extruded and thereby the heater 15 is subjected to high pressure which is continuously maintained after the mandrel is removed, the shell 10 being sufficiently hard and rigid to withstand the strain put upon it by the mandrel. After this part of the process is complete the cylindrical bore of the member 20 is either provided with screw threads 21 as shown in Fig. 4, to coöperate with a screw-threaded shank 26 of the work or body member 25, or is otherwise adapted to coöperate with a projection or some part of the working member. For example, the member 20 may be provided with a taper bore to receive a taper projection 26ª as shown in Fig. 6.

Among the advantages of my invention he following may be emphasized. The working member is readily removable from the device and may be replaced when worn or damaged. The pressure to which the heating element is subjected is independent of the working member and consequently the position of the heating element is maintained at all times. The pressure between the parts 15 and 20 is furthermore very useful in transferring a maximum portion of the generated heat to the working element. By reason of its function the member 20 may be termed a swaged or extruded soft metal compression member.

The size and arrangement of parts of the device illustrated may be varied within the spirit and scope of my invention and I intend that only such limitations be imposed as are indicated in the appended claims.

What I claim is:

1. The method of forming an annular electric heater that consists in assembling a heater element between a relatively rigid reaction member and a relatively soft expansion member and swaging the soft member to put the heater element under permanent compression.

2. The method of forming a cylindrical electric heater that consists in assembling an annular heater element over a relatively soft tubular expansion member and within a relatively rigid reaction member and extruding the soft tubular member to compress the heater element.

3. The method of forming a cylindrical electric heater that consists in assembling a tubular electric heater element between a soft tubular expansion member within and a rigid sleeve or holder without, and forcing a rigid expanding tool through the opening in the soft tubular expansion member.

In testimony whereof, I have hereunto set my hand this 12 day of May, 1914, in the presence of two subscribing witnesses.

WILLIAM S. HADAWAY, Jr.

Witnesses:
F. GRAVES,
ETHEL COHEN.